Dec. 22, 1959  L. W. GODDU ET AL  2,917,971
LENS MARKING DEVICES

Filed March 15, 1956  5 Sheets-Sheet 2

INVENTOR
OSCAR W. DILLON
LLOYD W. GODDU
BY
*Louis L. Gagnon*
ATTORNEY

Dec. 22, 1959 L. W. GODDU ET AL 2,917,971
LENS MARKING DEVICES
Filed March 15, 1956 5 Sheets-Sheet 3
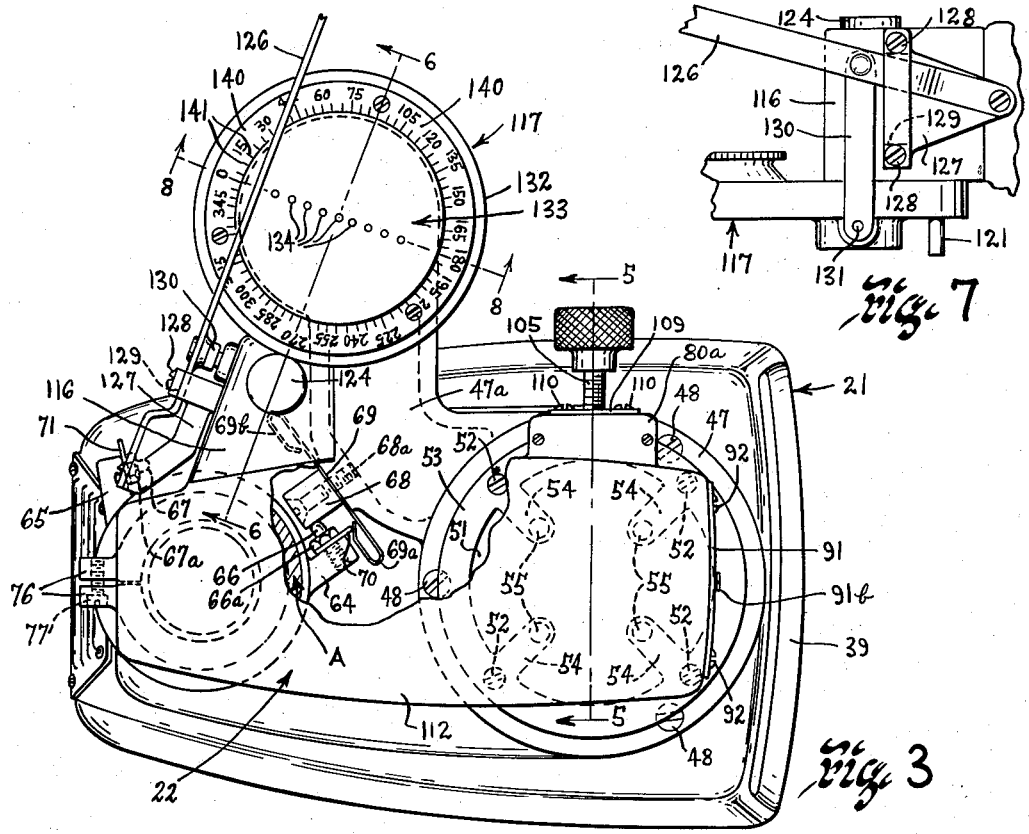
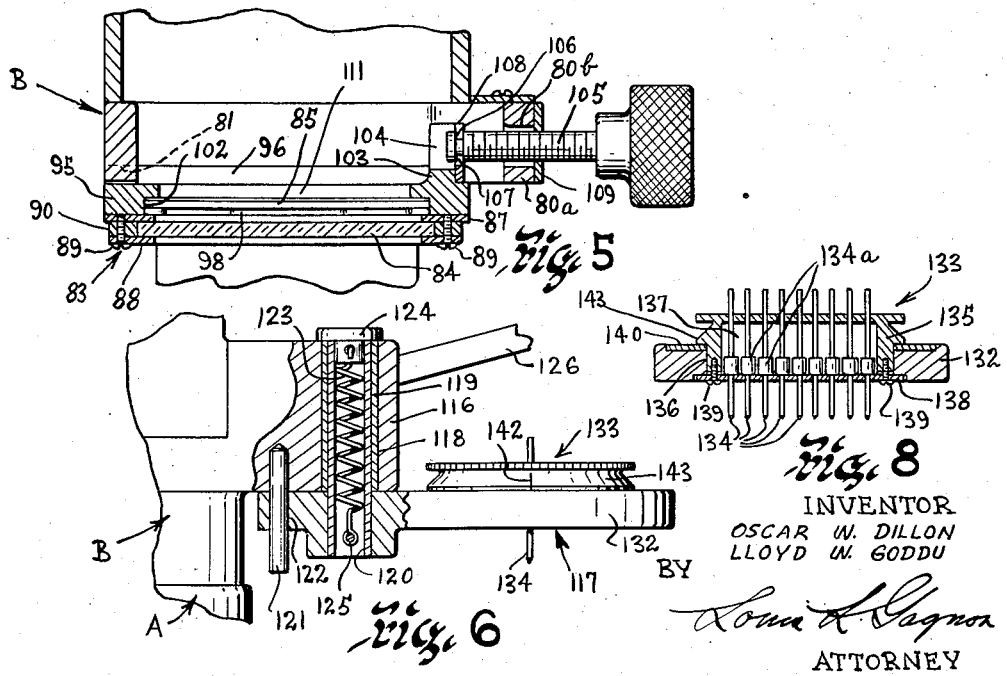
INVENTOR
OSCAR W. DILLON
LLOYD W. GODDU
BY
Louis L. Gagnon
ATTORNEY Dec. 22, 1959     L. W. GODDU ET AL     2,917,971
LENS MARKING DEVICES
Filed March 15, 1956     5 Sheets-Sheet 4
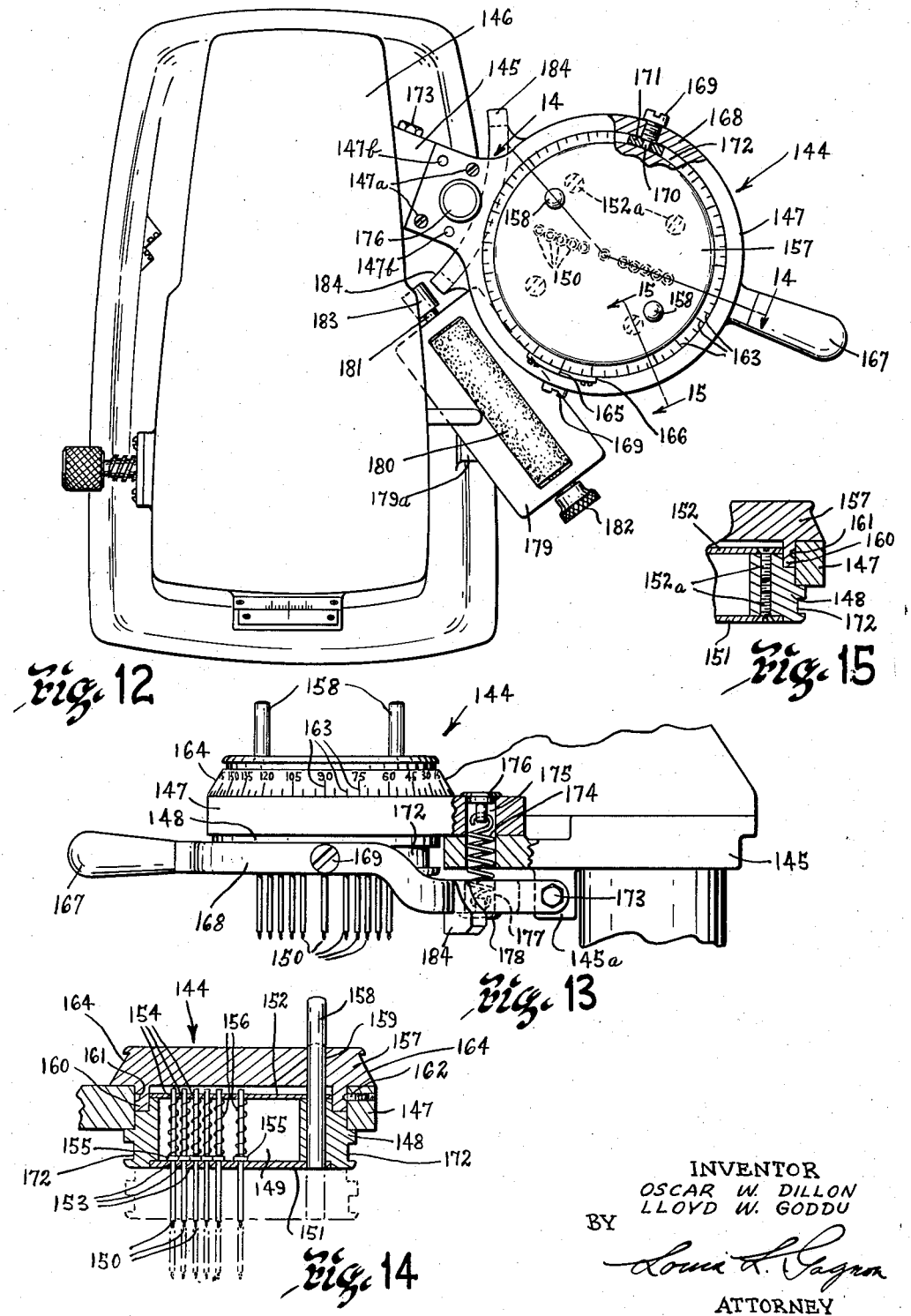
INVENTOR
OSCAR W. DILLON
LLOYD W. GODDU
BY
Louis L. Gagnon
ATTORNEY

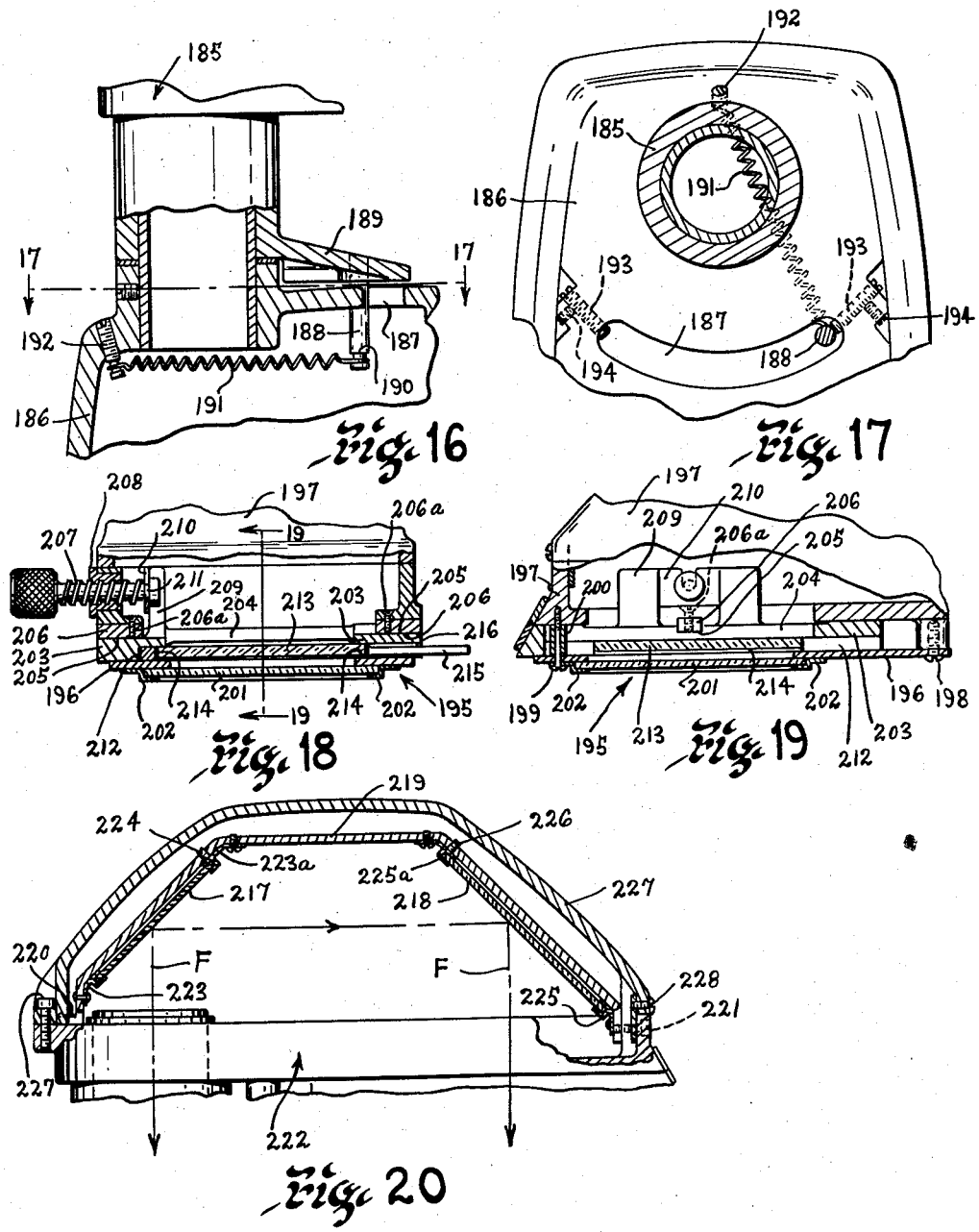

United States Patent Office 2,917,971
Patented Dec. 22, 1959

2,917,971

LENS MARKING DEVICES

Lloyd W. Goddu and Oscar W. Dillon, Sturbridge, Mass., assignors to American Optical Company, Southbridge, Mass., a voluntary association of Massachusetts Application March 15, 1956, Serial No. 571,692

2 Claims. (Cl. 88—56)

This invention relates to an instrument for marking semi-finished lens blanks and has particular reference to a device for and method of locating the reading segments, axis and optical centers of bifocal lens blanks according to the prescriptive requirements desired of the finished lens prior to the finishing of said lens blanks.

Heretofore bifocal lens layout and marking devices have been constructed with means for projecting or otherwise positioning various patterns which are to be viewed through the lens blank, said patterns are usually made up of small contiguously related squares of contrasting colors which, when viewed through the lens, are magnified more by the segment portion than by the body portion of the lens thereby making a visual distinction between the segment portion and the body portion of said lens due to the difference of power in the segment portion with relation to the body portion.

It has been found, however, that when the added power in the segment portion of the lens is very slight as compared to that of the body portion of said lens, it becomes very difficult to distinctly define the outline of the segment by the above method.

Layout and marking devices have also been constructed with pinholes or other such sighting means which require that the operator of said devices must position his eye exactly over the sighting device to properly align the lens for marking in order to eliminate errors due to parallax, etc.

By so restricting the movement of the operator of such a device during the marking procedure fatigue and lost time may be encountered since in handling the lenses prior to and after marking, the operator must remove his eye from the sighting position and return thereto as each lens is positioned within the device.

Other devices known heretofore require the use of mechanical locating members such as pointers and intricate lens supporting means. Such devices tend to complicate the aligning and marking procedure as well as partially obstruct the view of the portion of the lens to be aligned.

It has also been the practice in devices of the above character to view an alignment pattern through the lens to be aligned and marked, said pattern being positioned under the lens and consisting of vertical and horizontal lines used for decentering the segment portion of the lens. By so doing it has been found that errors result due to the magnification and prism effect which may be present in the lens being aligned and marked.

It is, therefore, a primary object of this invention to provide a simple, efficient and accurate means for properly locating and marking the optical center and cylinder axis of a semifinished bifocal lens blank, with respect to the reading segment of said lens blank according to a predetermined prescription wherein the outline of the reading segment is clearly defined with respect to the adjacent portions of the body of the lens blank and extreme accuracy in alignment of said outline with respect to said cylinder axis and optical center may be accomplished regardless of the magnification or prism encountered in the lens blank.

Another object is to provide a device of the character described wherein an image of the outline of the reading segment and a further image of the targets used for alignment purposes are simultaneously projected upon a screen or the like which, in turn, may be viewed by an adjustable mirror thereby allowing freedom of movement of the operator during the aligning and marking procedures since the screen may be viewed from any convenient angle without the introduction of parallax, etc.

Another object of the invention is to provide in a layout marker means for supporting a bifocal or multifocal lens in adjacent relation with a transparent target having scale means thereon for determining the location of the top of the segment with respect to the ultimate optical center of the lens and another transparent target having guide lines thereon for centering the vertical center line of the segment with respect to the ultimate location of the optical center of the finished lens and means for projecting an image of said targets together with an outline image of the segment onto a translucent screen on which said projected images may be indirectly viewed by an adjustable concave mirror.

Another object is to provide a device wherein the usual contrast between the reading segment and the adjacent portions of the lens blank is always clearly discernible regardless of the amount of added power provided by the reading segment, or color, of the lens to be aligned and marked.

Another object is to provide a device as described above wherein a clear, unobstructed view is obtained of the lens body portion, reading segment and guide lines, used to align said segment, during the entire aligning procedure.

Another object is to provide a device for marking a predetermined optical center and cylinder axis on a semi-finished bifocal lens blank wherein the marking device, when properly positioned over the lens blank to be marked, will be adapted to approach and contact the finished surface of the lens blank along an axis disposed vertically and at right angles to the general plane of the finished surface of said lens blank thereby providing accurate markings upon the finished surface thereof regardless of the thickness of said lens blank.

Another object is to provide a marking device of the above character comprising an angularly adjustable holder having a diametrical row of yieldable marking pins contained therein and adapted to alternately engage an ink pad and the finished surface of a semi-finished bifocal lens blank, suitably aligned to receive said markings.

Another object is to provide suitable transparent targets or marking guides having fine, clear cut reference lines inscribed thereon adapted to be projected through the bifocal lens blank and registered upon a viewing screen or the like simultaneously with an image formed by the outline of the lens blank reading segment, and with one of said targets or marking guides being further adapted to be moved laterally and longitudinally in the plane of the lens surface for decentering the segment in relation to the optical center of the finished lens.

Another object is to provide a device of the above character which is compact, lightweight and simple to operate.

Other objects and advantages of the invention will become apparent from the detailed description which follows when taken in conjunction with the accompanying drawings in which:

Fig. 3 is a top plan view of one form of the device, partially broken away;

Fig. 5 is a fragmentary sectional view taken on line 5—5 of Fig. 3;

Fig. 6 is a fragmentary side view of one form of the lens marking mechanism shown partially in section and looking in the direction indicated by line 6—6 of Fig. 3;

Fig. 7 is a fragmentary view of the other side of the marking mechanism shown in Fig. 6;

Fig. 8 is a sectional view taken on line 8—8 of Fig. 3;

Fig. 9 is a view of the image formed by the aligning target and the outline of a bifocal lens blank reading segment as would be viewed by an operator of the device and showing the optical center and axis markings as they might be applied to the lens when the lens segment is decentered to the right;

Fig. 10 is a view generally similar to Fig. 9 but showing the image of an alternately shaped lens reading segment decentered to the left;

Fig. 11 is a view generally similar to Figs. 9 and 10 but showing a different type of target being used for aligning the lens blank reading segment;

Fig. 12 is a top plan view of another form of the invention;

Fig. 13 is a fragmentary side view of another form of a marking device taken in conjunction with Fig. 12;

Fig. 14 is a sectional view taken on line 14—14 of Fig. 12;

Fig. 15 is a sectional view taken on line 15—15 of Fig. 12;

Fig. 16 is a fragmentary view partially in section of another means for properly positioning the marking device, shown in Fig. 13, over a lens blank to be marked.

Fig. 17 is a sectional view taken on line 17—17 of Fig. 16;

Fig. 18 is a fragmentary sectional view of another form of the target supporting mechanism;

Fig. 19 is a fragmentary sectional view taken on line 19—19 of Fig. 18; and

Fig. 20 is a fragmentary side sectional view of a modified form of the device showing light deflecting means.

Figure 1:
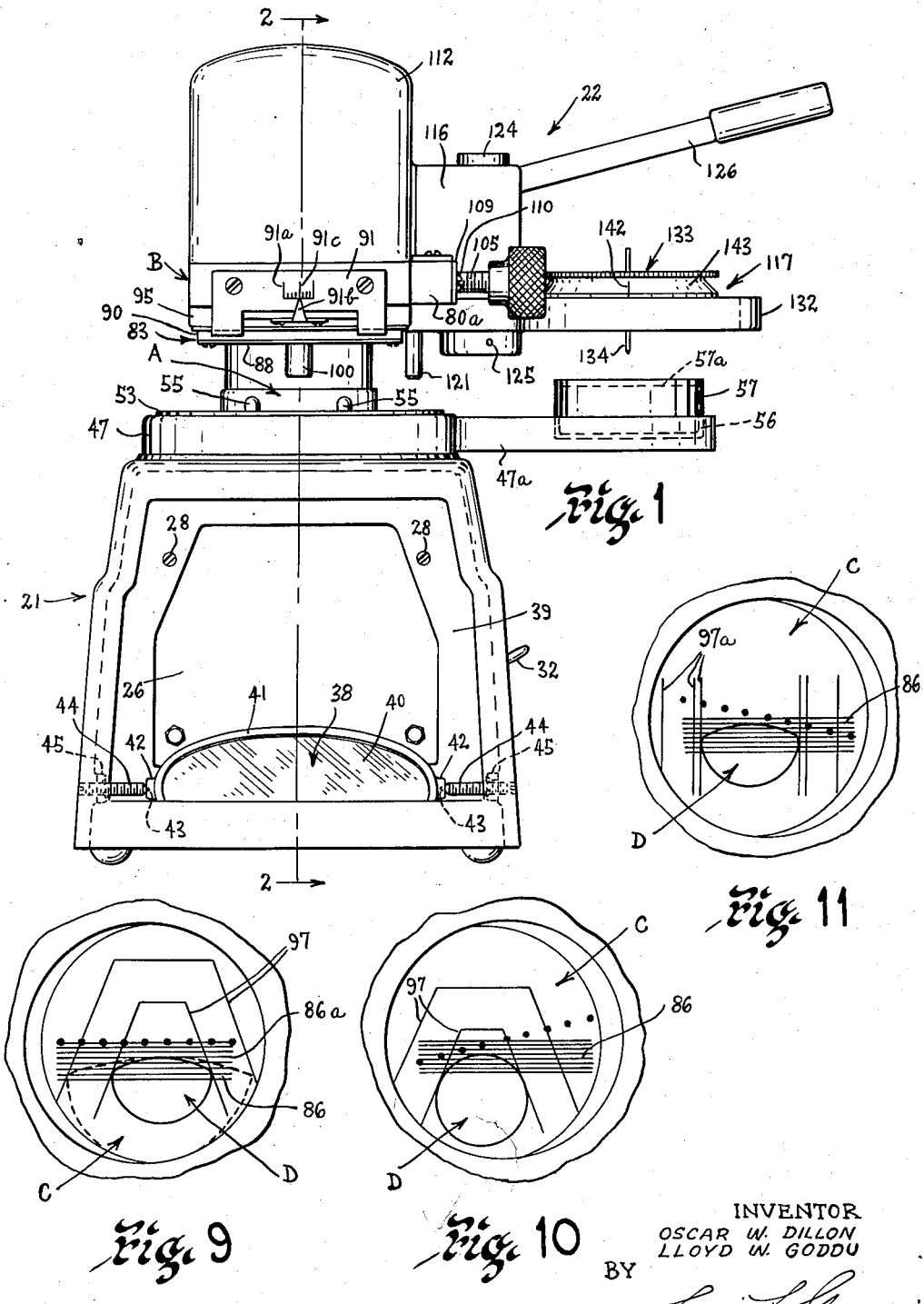
Fig. 1 is a front elevational view of one form of the device embodying the invention.

Referring more particularly to the drawings wherein like characters of reference designate like parts throughout the several views, one form of the device embodying the invention, as shown in Figs. 1 through 11, comprises broadly a base 21 for supporting and viewing a bifocal lens blank and a head 22 rotatably mounted upon said base 21 for aligning and marking a bifocal lens blank when said blank is positioned upon the base 21.

The base 21 is preferably cast or otherwise formed of aluminum, cast iron or any other suitable material and is so constructed as to form a hollow interior which is open at the bottom. The hollow interior is further divided into two chambers 23 and 24 by a wall or the like 25 which is formed as an integral part of the base casting 21 and said wall 25 has an opening 26 formed therein.

A plate 27 formed of a suitable sheet metal or the like is positioned over the opening 26 and is secured thereto by means of screws or the like 28. A point source of light or lamp 29 is supported upon one side of the plate 27 by means of a socket or suitable supporting member 30 extending into the cavity 23 and being adapted to project a beam of light upwardly through an opening provided in the upper portion of the base 21 as will be described in detail hereinafter. Beneath said light source 29 there is further mounted upon the plate 27 a transformer or the like 31 electrically connected to the lamp 29 and adapted to control the amount of current passing to said lamp. The transformer is, in turn, further electrically connected through a suitable on-and-off switch 32, mounted on one side of the base 21, to a source of current carried by an electrical conductor 33.

An opening 34 is povided in the rear wall of the chamber 23, said opening 34 having positioned thereover a cover plate 35 formed of a suitable sheet metal and secured to the base 21 by means of screws or the like 36. The cover plate 35 is further provided with louvered openings 37 struck out or otherwise formed to allow the evacuation of the heated air within the cavity 23 caused by the operation of lamp 29. By so evacuating the heated air surrounding the lamp 29, a circulatory system is set up wherein cool air would be caused to flow upward through the opened bottom of the base 21 and upon being heated by the operation of the lamp 29 would exhaust through the openings 37 as described above thereby eliminating the overheating of the lamp 29 and adjacent parts thereof.

By removal of screws 36, plate 35 may be detached from the base 21 thus providing easy access to the cavity 23 through opening 34 and allowing the removal of lamp 29 when necessary for replacement purposes.

The forward chamber 24 formed within the base 21 has provided therein a pivotally mounted mirror 38 which is used to view the combined images of a bifocal lens segment and targets for alignment of said segment image as will be described in detail hereinafter. The mirror 38 is preferably formed with a concave reflecting surface for enlarging the reflected image.

Figure 2:
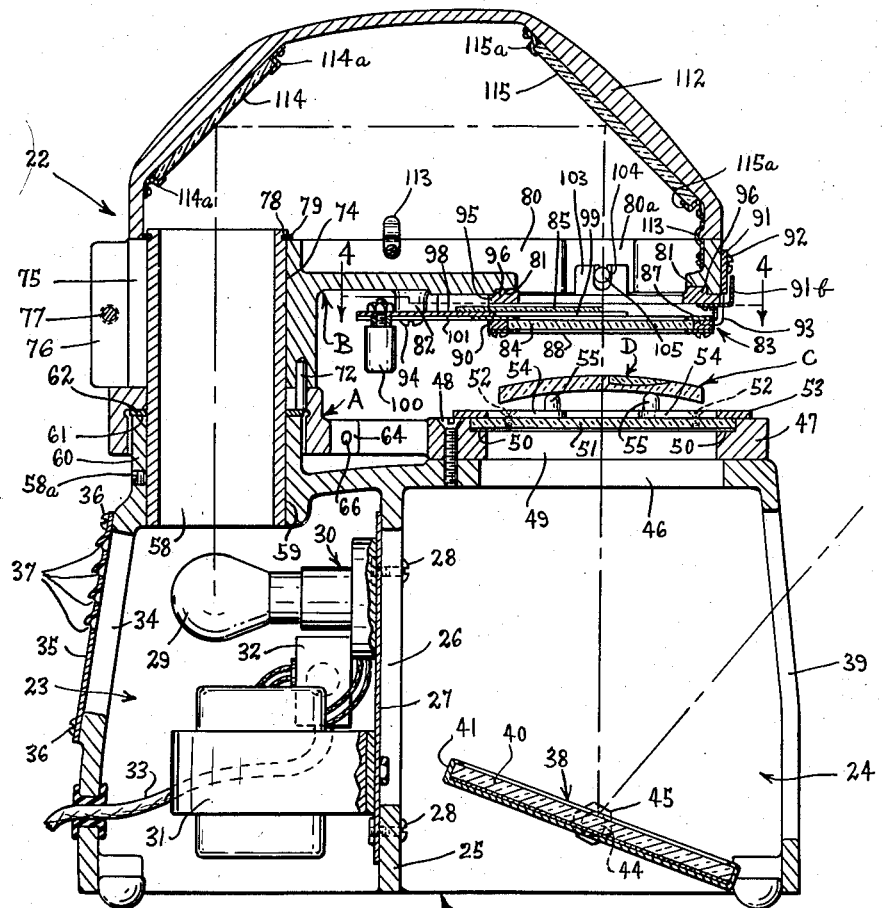
Fig. 2 is a side sectional view taken substantially on line 2—2 of Fig. 1.

In order to view the above-mentioned images of the lens segment and targets, there is also provided an opening 39 in the front of the base 21 communicating with the chamber 24 as shown in Figs. 1 and 2.

The mirror 38 comprises a circular glass plate 40 silvered or otherwise coated on one of its surfaces thereof for reflective purposes and is mounted within a frame 41 constructed of suitably formed sheet metal or the like having diametrically opposed lugs 42 attached thereto. The lugs 42 are further adapted to receive the conically shaped ends 43 of supporting screws or the like 44 which are threadedly attached to the opposed side walls of the base 21 thereby allowing the mirror 38 to be rotated about the axis of the screws 44. Rotation of the screws 44 in one direction within the side walls of the base 21 would cause said screws to be forced inwardly of the side walls and thereby increase the frictional engagement of the conical ends 43 within the lugs 42. Rotation of the screws 44 in the other direction, however, would relieve the tension between lugs 42 and the ends 43 of the screws 44 thereby allowing the mirror 38 to be freely rotated about the axis of said screws 44. When the desired amount of tension upon the mirror lugs 42 is obtained by the above-described method, lock nuts 45 which are threadedly attached to the screws 44 are tightened against the sidewalls of the base 21 to prevent further accidental rotation of said screws 44.

A circular opening 46 is provided in the top of the base 21 and is positioned over and in vertical alignment with the center of the mirror 38. A circular supporting member 47 having an L shaped extension 47a integrally formed therewith is secured directly over said opening 46 by means of screws or the like 48 which threadedly engage the top of the base 21. Said supporting member 47 is further provided with a circular opening 49 aligned with opening 46 and having a circular shouldered portion 50 adapted to receive a ground glass viewing screen or the like 51 which, in turn, is attached by means of screws, pins or the like 52 to a circular plate 53 overlying the shouldered opening 50 and intimately contacting the top of the plate 47. Said circular plate 53, preferably formed of sheet metal or the like, is provided with inwardly extending fingers 54, the ends of which are further provided with upstanding pins or the like 55 having rounded or spherically formed tops adapted to be engaged by a lens blank when said lens blank is positioned thereupon for alignment and marking purposes, as will be described in detail hereinafter.

The plate 53, pins 55 and ground glass 51 assembly is so constructed as to be rotatably mounted upon supporting member 47 since it will be noted in Fig. 2 that sufficient clearance between the bottom of ground glass 51 and the shouldered portion 50 is provided to allow such rotation if desired without affecting the intimate contact between plate 53 and supporting member 47.

The L shaped extension formed with support member 47, as described previously, has provided at its outer end, a cavity 56 cast or otherwise formed therein, said cavity being adapted to receive a suitable inkwell or the like 57 which is used for lens marking purposes, as will be described in detail hereinafter.

The head 22 of the device is composed of three sections cast or otherwise formed of a metal similar to that of the base 21 and having said parts assembled to function as a single unit, as will be described hereinafter. The said head 22 is rotatably mounted upon the base 21 by means of an elongated tubular supporting member 58 which is intimately fitted within a vertically extending bore 59, machined or otherwise formed, in an upstanding portion 60 of the base casting 21 and is secured therein by means of a set screw or the like 58a.

The top of upstanding portion 60 of the base casting 21 is accurately machined or otherwise formed to a flat surface 61, over which is positioned a washer or the like 62, preferably formed of a different metal than that of the base 21 for the purpose of minimizing wear between the flat surface 61 and the rotatable member thereabove.

Rotatably mounted upon the tubular supporting member 58 and positioned over the washer 62, there is provided a locating member hereinafter referred to as casting A, having two spaced, outwardly extending lugs or the like 64 and 65, Figs. 2 and 3, which are integrally cast or otherwise formed upon said casting A. The said lugs 64 and 65 are further provided with adjustable stop pins 66 and 67 which threadedly engage the lugs 64 and 65 respectively and are locked in their desired extended position by means of locking nuts 66a and 67a, as shown in Fig. 3.

A stop 68 is secured to one side of the L-shaped extension 47a of the supporting member 47 by means of a screw or the like 68a and extends outwardly of said L-shaped extension a distance sufficient to be contacted by the stop pins 66 and 67 when rotation of the head 22 of the device is effected.

It can be seen from Fig. 3 that rotation of the head 22 of the device in a clockwise direction will cause stop pin 67 to be moved into contact with one side of the stop 68 thereby preventing any further clockwise rotation of said head 22, whereas counterclockwise rotation of the upper portion 22 will cause stop pin 66 to be moved into contact with the other side of stop 68 and similarly prevent further counterclockwise movement thereof.

In order to yieldably retain one or the other of the stop pins 66 and 67, positioned against the stop 68, for purposes of aligning and marking a bifocal lens blank, as will be described in detail hereinafter, there is provided a spring clip 69 which is attached to the L-shaped extension 47a by means of stop 68 and screw 68a. One end 69a of spring clip 69 is so positioned as to be engaged by a metal plate 70 when the stop pin 66 is about to approach the stop 68. Plate 70 is secured to lug 64 by lock nut 66a. As counterclockwise rotation of stop pin 66 continues the end 69a of the spring clip is forced in a direction toward the L-shaped extension 47a until the stop pin 66 contacts stop 68, whereupon the end 69a of the spring clip will again assume its normal position and due to its construction will latch over plate 70 and yieldably retain said stop pin 66 against stop 68.

By forced rotation in a clockwise direction the end 69a of the spring clip will be caused to release the plate 70, stop pin 66 and lug 64 assembly. Continued clockwise rotation would cause the engagement of plate 71, which is secured to the lug 65 by the opposed end 69b of the spring clip. Plate 71 is constructed and assembled identical to plate 70.

The end 69b of the spring clip and the plate 71 would function in a manner identical to the above description for plate 70 and the end 69a of spring clip 69.

Positioned above the casting A, as shown in Fig. 2, and secured thereto by means of a press-fitted pin or the like 72, is a further cast or otherwise formed supporting member hereinafter referred to as casting B which is rotatably mounted upon the upper end of the tubular supporting member 58 by means of a vertically extending bore 74 within said casting B. A slotted or otherwise formed opening 75 is provided in the portion of the casting B which surrounds the tubular support 58, said slotted opening 75 being adapted to communicate with the bore 74 and extend vertically throughout the length of said bore 74. The casting B is further provided with integrally formed outwardly and rearwardly extending lugs or the like 76 adjacent the opposed sides of the slot 75. The said lugs 76 are connected by a stud or the like 77 which threadedly engages one of the lugs 76 and is adapted to freely rotate within the other of said lugs 76. Rotation of the stud 77 in one direction will cause the lugs 76 to be drawn together thereby increasing the frictional engagement of the bore 74 and the tubular supporting member 58 while rotation of the stud 77 in the other direction will allow the casting B to be freely rotated about the tubular member 58.

To retain the casting B and casting A in the proper vertical position upon the tubular support 58, see Fig. 2, an annular slot 78 is provided in the top of said tubular support 58 and a split retaining washer 79 is positioned in said slot and overlies the top of casting B.

Casting B is further provided with a forwardly extending portion 80, the underside of which has formed thereon a pair of guide ways or the like 81 and two downwardly extending bosses 82 which are adapted to support a target assembly 83 used in aligning a lens blank prior to the marking of said lens blank, as will be described hereinafter. The said forwardly extending portion 80 is further provided with a protruding portion 80a, Figs. 1, 2, 3 and 5 which is adapted to receive and further support the target assembly 83 mentioned above.

Figure 4:
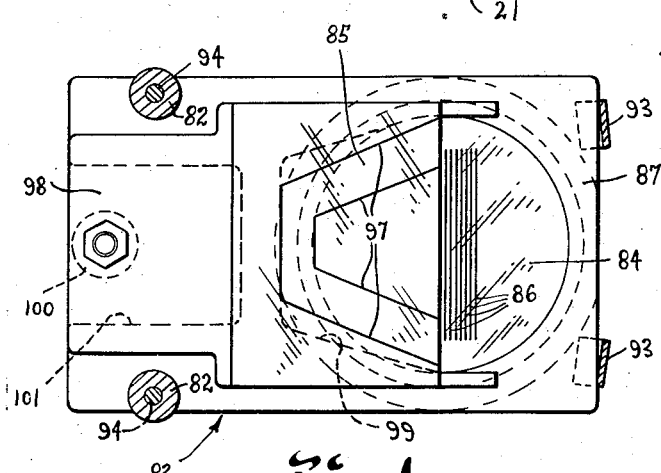
Fig. 4 is a sectional view taken on line 4—4 of Fig. 2 and showing the target-supporting mechanism.

Referring more particularly to Figs. 2, 4 and 5, the target assembly 83 is broadly comprised of a stationary target 84 and a movable target 85. The stationary target 84 comprises a series of transversely extending clear cut lines 86 painted, etched or otherwise provided upon a circular sheet of suitable transparent material such as glass or plastic and are so spaced as to provide a one millimeter distance between the image of each of said lines 86 when said image is projected upon the surface of a lens positioned therebelow as shown in Fig. 2.

It will be noted at this point that the spacing of the lines 86 need not be restricted to the one millimeter distance but that the use of the millimeter scale has become common practice in the optical trade.

Stationary target 84, as shown best in Fig. 5, is mounted on the underside of a sheet metal supporting plate or the like 87 by means of a ringlike member 88 secured to plate 87 by screws or the like 89 which extend through a spacer member 90, which surrounds the periphery of the target 84, and threadedly engage the plate 87. The ringlike member 88 and spacer 90 are positioned so as to properly align the target 84 with a circular opening which is provided in the supporting plate 87.

Supporting plate 87 is fixedly secured to the forwardly extending portion 80 of casting B by means of a clamp or the like 91, Figs. 2 and 3, which is mounted upon the forward end of said casting B by means of screws or the like 92. The clamp 91 is further provided with two downwardly extending fingers 93 having their ends bent inwardly and positioned under the forward end of the plate 87, as shown best in Figs. 2 and 4.

The opposed end of the plate 87 is secured to the casting B by means of screws or the like 94 which extend through said plate 87 and threadedly engage the two downwardly extending bosses 82 described previously.

Slidably mounted upon the upper surface of the plate 87, there is provided a slide 95 adapted to carry the movable target 85. The slide 95 is constructed with a pair of tracks or the like 96 which are adapted to slidingly fit within the guideways 81 described above.

The movable target 85 comprises a transparent sheet of glass, plastic or the like upon which is painted, etched or otherwise provided forwardly diverging or V-shaped guide lines 97 which are used to center the segment portion of a bifocal lens blank prior to the marking of said lens blank, as will be described in detail hereinafter.

The target 85 is cemented, riveted or otherwise secured to the upper side of a sheet metal carrier or the like 98, Figs. 2, 4 and 5, having a forwardly extending opening 99 provided therein to allow the passage of light through the major portion of the target 85 as will be described later. A handle 100, used to manually slide the carrier 98 and target 85 assembly longitudinally, is secured to the rear portion of the carrier 98 and extends through an enlarged opening 101, Figs. 2 and 4, provided in the plate 87. The opening 101 is of a shape and size sufficient to allow the desired forward and backward movement of the carrier 98, as well as necessary sidewise movement thereof.

The longitudinal movement of the target 85, by the handle 100, is to allow the operator to position the V-shaped guide lines 97 into bisecting relation with the outer boundaries of the segment, when the segment is moved into decentered position, thus being able to compensate for different size segments.

To restrict and regulate the sidewise movement of the carrier 98 and target 85 assembly, a forwardly extending channel 102, Fig. 5, is provided on the underside of the slide 95 into which the carrier 98, target 85 assembly is positioned. By manipulation of the handle 100, the target 85 may be moved forwardly or rearwardly along the upper surface of plate 87 while being confined within the channel 102.

In order to move the target 85 crosswise of the stationary target 84, the slide 95 is further provided with an upstanding ear 103, Figs. 2 and 5, integrally formed at one end thereof and having a U-shaped slot 104 adapted to receive one end of an adjusting screw 105. The end of screw 105 is provided with an annular groove 106 which is fitted into a narrower U-shaped slot 107, provided in a plate 108 suitably fastened to the ear 103.

Adjusting screw 105 extends outwardly of ear 103 through an opening 80b in the protruding portion 80a of the casting B and threadedly engages a plate 109 which is secured to said protruding portion 80a by means of screws or the like 110, Figs. 1, 3 and 5.

Rotation of the adjusting screw in one direction will cause the screw to be advanced inwardly of threaded plate 109 and force the slide 95 and movable target 85, which is confined within channel 102 of slide 95, to be moved in a similar direction. If the adjusting screw 105 is rotated in the opposite direction, however, said screw 105 will move in the reverse direction thereby causing the slide 95 and target 85 assembly to follow and be moved in the opposite direction across the stationary target 84.

In order to record the sidewise movement of the slide 95, suitable scaled markings 91a are engraved, printed or otherwise provided upon the clamp 91, Fig. 1. A pointer or the like 91b, attached to the slide 95 and movable therewith, extends outwardly and upwardly from said slide 95 to a position adjacent the markings 91a for recording the distance that said slide is moved when the adjusting screw 105 is rotated.

It is to be noted at this point that the guide ways 81 and tracks 96 are accurately machined and interfitted thereby preventing any lateral movement of the slide 95, while being adjusted as described above, also that the channel 102, formed in the slide 95 is further accurately machined so as to form a path of travel for the carrier 98 and target 85 assembly which is exactly 90 degrees to the movement of said slide 95 and that the underside of both the slide 95 and carrier 98 contact and slide along the upper surface of plate 87.

It is to be further noted that the stationary target 84 is aligned with and positioned over the ground glass viewing screen 51 and that the target 85 is further adjustably mounted over said stationary target 84 so as to allow the passage of light through a suitable opening 111 provided in the slide 95, movable target 85, stationary target 84, a bifocal lens blank to be aligned and marked and ground glass 51 for purposes of aligning said bifocal lens blank prior to the marking of same.

A cover 112 is fitted over casting B and is secured thereto by means of spring clips or the like 113 fastened to said casting B and adapted to snap over suitable protrusions formed on the inner surface of said cover 112 as shown in Fig. 2. Two mirrors, preferably of the front surface reflective type, 114 and 115 are secured to the upper inside surface of the cover 112 by means of suitable brackets or the like 114a and 115a, respectively. Mirror 114, being located at the rear inner surface of the cover 112, is so positioned as to be directly over and centrally aligned with the opening provided in the tubular member 58 and disposed at an angle of substantially 45 degrees to the vertically extending axis of said tubular member 58, so that the light emitted upwardly by the light source 29 through said tubular member 58 will strike the mirror 114 and thence be directed forwardly to the second mirror 115 positioned on the forward inner wall of the cover 112. The mirror 115 will then direct the light downwardly through the movable target 85, stationary target 84, a bifocal lens blank to be aligned and screen 51 to viewing mirror 38.

Referring more particularly to the projection of the light described above, it is to be noted that the light source 29 will hereinafter be considered as substantially a point source of light which will emit diverging rays therefrom and since it would be desirous to have said light rays nearly parallel to each other, at the points where they pass through the targets 85 and 84 and lens blank C, Fig. 2, the mirrors 114 and 115 are positioned as described above in order to compactly form a relatively long path of light between the source 29 and the ground glass screen 51 thereby causing said rays of light to be substantially parallel at said targets 84 and 85 and lens blank C.

While the light projecting means employed do not provide parallel rays at the critical point in the system, it does provide substantially parallel rays which are accurate enough for the purpose of the instrument, without involving the use of expensive collimating lens systems, and without departing from its compact size.

Since the above-mentioned light rays are not exactly parallel when passing through the targets 84 and 85 to the surface of the lens blank C, it is, therefore, necessary to compensate for the slight diverging effect which will occur therebetween and cause the spacings between the images of the target lines projected on the lens blank to be slightly enlarged. In order that the images of the target lines 86 of target 84 be spaced on the lens blank C, a desired increment of measurement, such as one millimeter, the actual target lines on the target are spaced slightly closer together by an amount sufficient to compensate for the divergence of the light rays so that when projected on the lens blank, they will be spaced the desired distance apart. To compensate for the divergence of the light rays in relation to the lateral positioning of the image of the V on the target 85, the scale markings 91a on the clamp 91, which record the lateral movement thereof are spaced closer together by an amount sufficient to compensate for the divergence of the light rays so that movement of the target, as indicated on the scale, will move the image of the V projected on the lens blank C the desired distance. The distance between the targets and the lens blank and the angle of the light rays therebetween are the controlling factors in determining the spacing of the lines 86 of the target 84 and the spacing between the scale markings 91a.

The difference in curvatures and index of refraction of the segment portion D with respect to the major portion of the lens blank C, because the light is substantially parallel, creates a discrete optical boundary which is shadowed by the point source illumination system and thus causes an image of the outline of said segment portion D to be simultaneously projected, with the images of the targets, through the lens blank C and onto the screen 51.

Since the distance between the lens blank C and the ground glass screen 51 is relatively short as compared to the distance from the targets to the light source 29 and the angle of divergence of the light rays is very slight at said targets and lens blank C, the combined images of the targets and the outline of the segment portion D as viewed upon the screen 51, by means of mirror 38, are seen as distinct clean-cut lines which are readily visible to the operator of the device.

Casting B also has integrally formed thereon an outwardly extending portion 116 adapted to support one end of a lens marking device 117 as shown in Figs. 1, 3, 6 and 7. The portion 116 has a vertically extending bore 118 therethrough, Fig. 6, which in turn is press fitted or otherwise provided with a bushing or the like 119 adapted to slidingly receive a tubular guide member 120 which is press fitted or otherwise secured to one end of the marking device 117.

To prevent rotation of the marking device about the axis of the tubular guide 120 and to further accurately locate said marking device 117 upon the extending portion 116, a locating pin 121 is press fitted or otherwise secured in the portion 116 and extends downwardly through a vertical bore 122 in the marking device 117, the bore 122 and pin 121 being of controlled dimensions so as to provide an intimate sliding fit therebetween.

In order to cause the marking device 117 to be urged upwardly and against the bottom of the extending portion 116 when not in the position of use, a spring 123 is provided within the tubular member 120 having one end thereof attached to a shouldered retainer 124 and the opposed end secured to the marking device 117 by means of a pin or the like 125 extending through the tubular guide 120.

Operation of the marking device 117 is accomplished by means of a handle or the like 126 which is pivotally attached to one end of a bracket 127, said bracket being secured to the outwardly extending portion 116 by means of screws or the like 128. Bracket 127 is further provided with a guideway 129, Figs. 3 and 7, adapted to receive the handle 126 and prevent sidewise movement thereof while allowing said handle to be moved up and down within said guideway 129.

A connecting link 130 is pivotally connected to the handle 126 at a point outwardly of the bracket 128 and adjacent the guideway 129 and extends downwardly to a second pivotal connection 131 on the marking device 117.

Downward movement of the handle 126 will then cause the marking device 117 to be correspondingly moved in the same direction, along the locating pin 121 and bushing 119 in which the guide member 120 is slidably mounted, thereby extending the spring 123.

Upon release of the handle 126 the marking device will again return to its initial position against the bottom surface of the member 116 due to the tension in the spring 123.

The opposed end of the marking device 117 is provided with a circular supporting portion 132 which is adapted to carry a rotatably adjustable holder 133 having a diametrical row of yieldable marking pins 134 mounted therein. The holder 133 is comprised of a circular retaining member 135, Fig. 8, rotatably mounted within a vertically extending bore 136, provided in the supporting portion 132, and having a cavity 137 formed therein to receive the marking pins 134.

In order to support the marking pins 134 within the cavity 137, a circular plate 138 is secured to the underside of the retaining member 135 by means of screws or the like 139. The plate 138 is further provided with a diametrical row of spaced openings adapted to slidably receive the lower ends of pins 134.

Marking pins 134 have provided thereon enlarged shouldered portions 134a which function as stops when in contact with the upper surface of plate 138 thereby limiting the downward movement of said pins 134 when not in the position of use. A further function of said shouldered portions 134a is to yieldably retain the pins 134 in the above-described downward position due to the added weight provided upon said pins by said shouldered portions.

The upper portions of the marking pins 134 extend vertically through holes provided in the top of the retaining member 135, said holes being precisely aligned with the holes in the plate 138 so as to accurately guide the pins 135 during the operation of the marking device 117 as will be more fully described hereinafter.

A ringlike plate 140, Figs. 3 and 8, having annular markings 141 painted, engraved or otherwise provided upon its upper surface thereof, is secured within a recess provided in the supporting portion 132 of the marking device 117. The annular markings 141 are preferably so spaced as to represent degrees and an indicating mark 142, Figs. 1 and 6, is provided upon an inwardly tapering portion 143 of the rotatable retaining member 135 which may be rotatably aligned with any desired degree marking to position the diametrical row of marking pins at any desired angle to be used in properly marking a lens blank as will be discussed in detail hereinafter.

It is to be noted that the inwardly tapering portion 143 of the retaining member 135 is so constructed as to overlie the ringlike member 140 and that clearance is provided between the underside of said retaining member 135 and the upper surface of plate 138 so that by the proper tightening of screws 139 the desired frictional engagement between the ringlike member 140, tapered portion 143, plate 138 and supporting portion 132 may be obtained.

The operation of the above-described device is as follows:

When viewed from the front as in Fig. 1, the head 22 of the device is rotated to the right until the stop pin 66 contacts the stop 68 thereby accurately aligning the target assembly, in the manner described above, for the lens alignment procedure to follow.

A lens blank C, which is usually of the fused bifocal type and having an optically finished convex surface thereon, is positioned upon the supporting pins 55 with said finished surface up as shown in Fig. 2.

The light 29 is then turned on by operation of switch 32 causing an image of the targets 84 and 85 and a further image of the outline of the reading segment portion D of said lens to be simultaneously projected through the lens blank C and onto the ground glass screen 51, as previously described. By proper adjustment of the mirror 38, the operator may view the above-described images which would appear substantially as diagrammatically illustrated in Figs. 9, 10 or 11 but without the diametrical row of dots appearing thereon.

In order to decenter the reading segment of the lens blank, a prescribed distance either to the right or left of the optical center of said lens blank, the entire target assembly 83 is adjusted by the operation of adjusting screw 105, as previously described, which will cause the pointer 91b to indicate the movement thereof along the scaled markings 91a. Markings to the right of center line 91c are used for decentering the segment portion of the lens blank to the right whereas markings to the left of center line 91c are used for decentration to the left. This adjustment positions the V-shaped lines 97 to the right or left of the normal central position thereof as indicated by the zero setting 91c on the scale 91a.

After having set the device for the proper decentration, as described above, the operator would next move the lens blank C forwardly or rearwardly as necessary over the pins 55 to a point where the top of the outline of the segment portion image will be positioned over the image of a selected one of the target lines 86 as viewed in mirror 38, which target line is selected according to the position desired of the top line of the segment below the optical center of the distance field of the finished lens. By so doing, the segment portion would be positioned a prescribed distance below the optical center of the lens since said optical center, due to the construction of the device, would normally be aligned with the uppermost of said lines 86.

By operation of the handle 100, as described previously, and simultaneous sidewise movement of the lens blank C over pins 55, the operator would then position the image of the segment portion D between a pair of the V-shaped target markings 97 with the opposite side edges of the segment appearing to touch the respective branches of the V while still maintaining the previous alignment of the top of the segment portion D with the selected target line 86 and, having thus completed the above-described alignment procedure, the lens is then ready for marking.

It is to be noted at this point that the V-shaped target markings 97 to be used in centering the segment portion D are selected in accordance with the size of segment encountered. That is, if the segment portion D was large, as shown by dotted lines in Fig. 9, the larger V-shaped marking would be used. It is also to be noted that the alignment markings 97 need not be restricted to the V-shape but that suitable vertical markings 97a such as shown in Fig. 11 and corresponding to different given sizes of segments may also be used.

In order to provide suitable optical center and cylindrical axis markings upon the finished surface of the lens blank C, which markings are used in connection with the finishing of the second side of said lens blank, the lens blank C is allowed to remain in its aligned position upon the pins 55 while the marking pin retaining member 135 is rotated in its holder 132 an amount sufficient to position the indicating mark 142 thereupon which is aligned with a selected degree marking 141 on the stationary plate 143. By so doing, the diametrical row of marking pins 134 are so angularly arranged as to provide a corresponding axis marking upon the lens blank C as follows.

The handle 126 is next depressed thereby causing the marking device 117 to move in a downwardly direction as described previously. This causes the bottom ends of the marking pins 134 to engage an inking pad 57a comprised of fabric, soft rubber or the like. The pad 57a is positioned within the inkwell 57 and is saturated with a suitable ink or the like to be deposited upon the ends of pins 134 when contact is made therewith.

Having thus provided the ends of marking pins 134 with a supply of ink, pressure on the handle 126 is released to allow it to be returned to its original position and the head 22 of the device is then manually swung to the left by a sidewise movement of the handle 126, until the locating pin 67 contacts the stop 68 as described above.

The target supporting mechanism at this point has been moved away from the lens blank C and the marking device 117 is precisely aligned over said lens blank. The handle 126 is again depressed until all the marking pins 134 have contacted the upper surface of lens blank C and have each deposited thereupon their respective supply of ink.

It will be noted that due to the convex curvature of the lens, the centermost pin which is to mark the optical center of the lens blank C will contact the lens first and be forced upwardly into the retaining member 133 and that each adjacent pair of pins thereof will successively likewise contact said lens surface until all have deposited their respective supplies of ink which will be in the form of a diametrical row of dots across the lens blank C as shown diagrammatically in Figs. 9, 10 and 11 and that the centermost dot will indicate the optical center of the lens.

It will be further noted that any desired angular position of the axis line thus provided may be accomplished by the setting of the retaining member 135 relative to the degree markings 141 as described above.

Referring more particularly to Fig. 9, an example of a typical alignment and marking procedure would be as follows:

If the requirements, according to a prescribed formula or the like, were such that the reading segment portion D of the lens blank be positioned three millimeters below and decentered a distance of three millimeters to the right of the optical center of the major portion of said lens blank, the head 22 would be positioned as shown in Figs. 1, 2 and 3 and the pointer 91b would be moved to the third indicating mark at the right of the center mark 91c. The lens blank C would then be moved forwardly upon pins 55 until the image of the top of the segment portion D appears over the third line 86a from the top. The said lens segment would then be centered between the V-shaped target lines 97 as described above.

If, according to the prescribed formula, the cylinder axis line were to be at zero or 180 degrees, which would be along a line 90 degrees to the vertical axis of the segment portion D of the lens blank as shown in Fig. 9, the indicating line 142 on the marking device would be set at zero or 180 degrees following which the lens blank would be marked according to the procedure described above.

It is to be again pointed out that the row of inked dots upon the lens blank C indicates a line which represents an axis line and that the centermost dot therein represents the optical center of said lens blank.

Other means for performing the above-described operations are shown in Figs. 12 through 20 wherein Figs. 12, 13, 14 and 15 show an alternative marking device 144 attached by means of a supporting bracket 145 to the head 146 of a device generally similar to the device described above.

A supporting ring 147 is attached to and aligned with said bracket 145 by means of screws 147a and pins 147b, Fig. 12. Rotatably mounted within said supporting ring 147, there is provided a marking pin retaining member 148 having a cavity 149 formed therein to receive a diametrical row of spaced marking pins 150 which are mounted within the cavity 149 by means of circular plates 151 and 152 secured to the under and upper sides respectively of the retaining member 148 by means of screws or the like 152a, Fig. 15. The plates 151 and 152 are further provided with a series of aligned diametrically extending openings 153 and 154, Fig. 14, which are adapted to slidingly receive the lower and upper ends, respectively, of the marking pins 150.

The marking pins 150 are provided with enlarged shouldered portions 155 which contact the upper surface of plate 151 to restrict their downward movement when not in use and the pins 150 are further provided with springs 156 positioned between the shouldered portions 155 and the upper plate 152 to yieldably retain said pins downwardly against the inner surface of plate 151.

Retaining member 148 is slidably mounted upon a rotatable upper carried 157 by means of guide pins 158 which are press fitted or otherwise secured to said retaining member 148 and extend upwardly through openings 159, Fig. 14, provided in the carrier 157 which are adapted to form an accurate sliding fit with said pins 158.

Carrier 157 has formed thereon a downwardly extending portion 160, Figs. 14 and 15, which is provided with an annular groove or the like 161 adapted to receive a spring loaded pin 162 which extends through the supporting ring 147 and frictionally engages said groove 161 to prevent the carrier 157 fom being accidentally lifted from the supporting ring 147 as well as to provide a tension upon said carrier 157 to prevent accidental rotation thereof.

Rotation of the carrier 157 will cause the retaining member 148 to rotate therewith due to the connecting guide pins 158 and thus angularly position the marking pins 150. In order to indicate the angular position of said marking pins 150, degree markings 163 are provided upon the inwardly tapering portion 164 of the carrier 157 which are adapted to be aligned with an indicating mark 165 provided upon the upper edge of a plate 166 which is secured to the support 147 as shown in Fig. 12.

Operation of the marking device 144 is accomplished by means of an outwardly extending handle or the like 167 integrally formed upon a pivotally mounted yoke 168 having two diametrically opposed pivot pins 169 threadedly secured therein. Each of said pivot pins 169 are further provided with reduced shouldered potions 170 which pivotally engage guide blocks 171 adapted to slidingly fit within an annular chanel 172 provided upon the downwardly extending portion of the retaining member 148.

The inwardly extending portion of the yoke 168 is pivotally secured to a downwardly extending lug 145a, Fig. 13, formed upon the supporting bracket 145, by means of studs or the like 173 and in order to yieldably retain said yoke 168 and retaining member 148 assembly upwardly and in contact with the support 147 when not in use, the upper portion of a spring 174 is positioned within a vertically extending bore 175 provided in the supporting ring 147 and bracket 145 and is attached to a shouldered retaining member 176 whereas the lower end of said spring 174 is positioned within a similar bore 177 provided in the yoke 168 and is attached to a second shouldered retaining member 178.

Downward movement of the handle 167 would then cause the yoke 168 to pivot about studs 173 and extend the spring 174 at which time the retaining member 148 would be carried downwardly with said yoke 168 due to its connected relation therewith, as described above, and upon release of handle 167 the tension provided by spring 174 would then cause said yoke 168 and retaining member 148 assembly to again return to its initial position.

It will be noted in Fig. 14 that the downward movement of the retaining member 148, as shown by dotted lines, causes guide pins 158 carried by said retaining member 148 to slide within the bores 159 thereby causing the marking pins 150 to be moved along a vertical axis while yoke 168 is pivoted about studs 173.

An inkwell 179, Fig. 12, is mounted upon the base of the device by means of a suitable bracket or the like 179a and is provided with a rotatable inking pad 180. The pad 180 is mounted upon a longitudinally extending shaft 181 which is rotatably supported at each end of said inkwell. One end of the shaft has provided thereon a knurled knob 182 for manual rotation of the pad 180 and the opposed end thereof is provided with a roller 183 so positioned as to be engaged by a track or the like 184 integrally formed upon the yoke 168.

Rotation of the head 146, preferably by the use of handle 167, in a clockwise direction, as viewed in Fig. 12, would cause the track 184 to contact the roller 183 and rotate the pad 180 within the inkwell 179. By such rotation a supply of ink, which would be provided in the bottom of the well 179, would be distributed over the surface of said pad 180 and continued clockwise rotation of the head 146 would further cause the marking pins 150, being in their uppermost position, to lightly contact the pad 180 thereby having a supply of ink deposited upon the lower ends of said pins.

The above-mentioned rotation of the head 146 would be continued until the marking device 148 was accurately positioned over a lens blank to be marked whereupon the handle would be depressed and cause the marking pins 150 to contact and deposit their respective ink supply upon the surface of said lens blank in a manner generally similar to that described previously for marking device 117.

Figs. 16 and 17 illustrate an alternative means for adjustably locating a rotatable head 185 in either a position for aligning a lens blank to be marked or for the marking of said blank in the manner illustrated and described previously for casting A.

The device illustrated in Figs. 16 and 17 comprises a base 186, generally similar to base 24, and has a radial slot or opening 187 provided in its upper surface thereof which is adapted to receive a locating pin 188 press fitted or otherwise secured within an outwardly extending boss 189 integrally formed upon the rotatable head 185.

The lower end of said pin 188 is provided with an annular groove 190 in which is fitted one end of a tension spring 191 and the opposed end of said spring 191 is attached centrally at the rear of the base 186 by means of a threaded screw or the like 192. Adjustable stop pins 193 are threadedly positioned within the base 186 so as to have their forward ends extending into the ends of the radial opening 187.

Rotation of the head 185 in a clockwise direction, as viewed in Fig. 17, would cause the attached locating pin 188 to move across the slot 187, at which time the tension in spring 191 would continue to increase until it would reach a point of maximum tension halfway across the slot 187. Continued rotation would cause said tension to decrease somewhat until the locating pin 188 contacted the left-hand stop pin 193. The over-center condition of the spring would then cause said spring to retain the locating pin against the stop pin 193. Counterclockwise rotation of the head 185 would then return the locating pin 188 to the position shown in Fig. 17 wherein the spring 191 is again in an over-center position. Stop pins 193 may be threadedly adjusted in order to accurately position the head 185 for lens blank alignment or marking purposes and locking screws 194 are provided to retain said stop pins 193 in their proper positions.

Figs. 18 and 19 illustrate an alternative target supporting mechanism 195 comprising a supporting plate 196 attached by means of screws or the like 198 and 199 to a head 197 which is generally similar to heads 22, 146 and 185, described previously. Screw 199 extends through a spacer member 200 positioned between the head 197 and the plate 196. A circular stationary target 201, similar to target 84, is mounted upon the forward underside of said plate 196 by means of supporting brackets or the like 202 and a slide 203, having a circular opening 204 provided therein, is slidably fitted between the upper surface of plate 196 and the undersurface of head 197. The slide 203 is further provided with a guideway 205 adapted to receive a pair of spaced keys 206 secured to the head 197 by means of screws or the like 206a. An adjusting screw 207 which threadedly engages a bushing 208, press fitted or otherwise secured to the head 197, extends inwardly and is attached to an upstanding boss 209, integrally formed upon the slide 203, by means of a slotted plate 210 which is suitably attached to the boss 209. The slotted plate 210 is fitted into an annular groove 211 formed on the inner end of the screw 207. Rotation of the screw 207 in one direction will cause said screw to be fed inwardly through the threaded bushing 208, thereby forcing slide 203 to move across the upper surface of plate 196 while being accurately guided by the keys 206 and guideway 205. Rotation of screw 207 in the other direction, however, will cause said slide 203 to be similarly moved in the opposite direction.

A channel 212, extending in a direction 90 degrees to the above-mentioned direction of movement of slide 203, is provided upon the underside of said slide 203 and is adapted to receive an adjustable target 213 similar to target 85 described above.

Target 213 which is formed of a suitable transparent plastic, glass or the like is, in turn, positioned within a pair of L-shaped metal slide members 214 which are adapted to contact the sides of channel 212 and the upper surface of plate 196. One of said L-shaped members has attached thereto an outwardly extending handle 215 which extends through a slot 216 provided in the slide 203.

Movement of the handle in a forwardly or rearwardly direction will cause the target to be moved over the plate 196 and guided by the channel 212 while rotation of the screw 207 will cause the target 213 to be carried by the slide 203 in a direction 90 degrees thereto.

The operation of the target supporting mechanism 195 is similar to that of target supporting mechanism 83, described above, wherein screw 207 functions similar to screw 105 and handle 215 likewise functions similar to handle 100.

Fig. 20 illustrates an alternative method of supporting a pair of reflective mirrors 217 and 218 wherein said mirrors function generally similar to mirrors 114 and 115 respectively. The arrangement shown in Fig. 20 comprises a supporting bracket 219 secured by means of screws or the like 220 and 221 to a head 222 which is generally similar to heads 22, 146, 185 and 197.

Mirror 217 is positioned upon one of the inner angled surfaces of bracket 219 by means of yieldable clips or the like 223 and 223a. Bracket 219 is further provided with an adjusting screw 224 which is adapted to engage the inner surface of clip 223a near the upper edge of mirror 217 and rotation of the screw 224 in one direction will cause said screw to advance toward said clip 223a thereby forcing the mirror to pivot slightly about clip 223 whereas rotation of screw 224 in the opposite direction will cause the mirror to return to its initial position due to the tension in the resilient clips 223 and 223a. By adjusting the mirror 217 in the above manner, a light beam, indicated by dot-dash line F, may be precisely aligned for use in the aligning of a lens blank as described previously.

Mirror 218 is positioned upon the forward inner sloping surface of the bracket 219 in a manner identical to that of mirror 217 wherein the function of mounting clips 225, 225a and adjusting screw 226 is performed in an identical manner.

A cover 227 is then positioned over the bracket 219 and is secured to the head 222 by means of a stud 227 at the rear of said cover and a screw 228 forwardly thereof.

From the foregoing description, it will be seen that simple, efficient and economical means and methods have been provided for accomplishing all the objects and advantages of the invention. However, it will be understood that various omissions, substitutions and changes in the forms and details of the embodiments illustrated may be made by those skilled in the art without departing from the spirit of the invention.

We claim:

1. In a device of the character described the combination of a pair of transparent target members in superimposed relation with each other and each having alignment indicia thereon, a translucent image receiving screen, lens blank supporting means between said target means and screen for supporting a multifocal lens blank having major and segment parts, said pair of target members and lens blank supporting means being in relatively close spaced relation with each other, means for directing light rays first through said target members and then through a multifocal lens blank supported on said lens blank supporting means for producing a composite image of said indicia and the boundary of said segment portion of said blank on said screen so as to be viewed from the side thereof opposite said target means, said light rays being provided with a known only slightly deviation from parallelism, one of said target members being stationary relative to said supporting means and the other of said target members being laterally adjustable relative to said supporting means, said alignment indicia on said stationary target embodying a plurality of parallel lines substantially equally spaced from each other a distance apart controlled in accordance with the deviation of said light rays from parallelism and the spacing between said stationary target means and said lens blank to compensate for said deviation of said light rays from parallelism and provide a desired increment of measure between the individual image forming light rays of each of said indicium at the location of the surface of said lens blank which faces said target means, said screen being adjacent said opposite side of the lens blank to receive said light rays after passing through said lens blank and form a composite image of said boundary of said segment portion and indicia on said pair of target members for viewing purposes, an immovable scale having markings thereon adjacent said adjustable target member, indicating means fixed to and movable with said adjustable target member for indicating extent of lateral adjustment of said adjustable target member on said scale, said markings being equally spaced from each other a controlled distance apart in accordance with the deviation of said light rays from parallelism and the spacing between said adjustable target member and the side of said lens blank which faces the same to compensate for said deviation of said light rays from parallelism and cause said scale to accurately indicate desired increments of movement when said image of said adjustable target is moved on said screen by moving said adjustable target member laterally, whereby said image forming light rays of said indicia on said stationary target member which enter said lens blank and pass therethrough will, when received on said screen along with said image of said segment portion, provide an image of said indicia of said stationary target member which is accurately proportonate relative to the proportionate size of said boundary image of said segment regardless of the power or prism effect of said lens blank and movement of said adjustable target member at increments designated by the markings on said scale will cause said image of said indicia on said adjustable target member, as viewed on said screen, to move laterally from a predetermined location on said screen predetermined distances of an amount desired and as accurately indicated by said scale regardless of the power or prism effect of said lens blank.

2. A device of the character described comprising a base, an apertured lens blank supporting table on said base adapted to receive and support multifocal lens blanks having major and segment portions, a pair of superimposed transparent target members facing one side of said table and relatively closely spaced therefrom, each of said members having alignment indicia thereon, a translucent image receiving screen adjacent the other side of said table, means for directing light rays having a known only slight deviation from parallelism through said target members and a multifocal lens blank when positioned on said table for producing a composite image of said indicia and the boundary of the segment portion of said blank on said screen so as to be viewed from the side thereof opposite said target members, one of said target members being stationary relative to said table and having its indicia in the form of spaced parallel lines with which the segment portion of a multifocal lens blank on said table may be aligned for controlling the positional relation of said segment in a finished lens to be formed therefrom, each of said lines being spaced apart a distance controlled in accordance with the deviation of said light rays from parallelism and the distance between said stationary target and the surface of said lens blank facing said stationary target so as to compensate for the deviation of said light rays from parallelism and provide desired increments of measure between the individual image forming light rays of each of said indicia when received at the location of said facing surface of said lens blank, the other of said targets being adjustable laterally relative to said table and having substantially V-shaped alignment markings thereon for use in combination with said indicia on said stationary target to further control the positional relation of the segment in a finished lens to be formed from said lens blank, an immovable scale adjacent said adjustable target having markings thereon, indicating means fixed to and movable with said adjustable target for indicating extent of lateral adjustment thereof on said scale, said markings being spaced apart a distance controlled in accordance with the deviation of said light rays from parallelism and the distance between said adjustable target and the surface of said lens blank facing the same to cause said scale to accurately indicate desired increments of movement when light rays which form images of said alignment markings are moved laterally across said surface of said lens blank by moving said adjustable target laterally, whereby said image forming light rays of said indicia on said stationary target member which enter said lens blank will, when received at said screen along with said image of said segment portion of the lens blank, provide an image of said indicia which is accurately proportioned relative to the proportionate size of said boundary image of said segment regardless of the power or prism effect of said lens blank, and movement of said adjustable target member at increments designated by the markings on said scale will cause said image of said alignment markings on said adjustable target member, as viewed on said screen, to move laterally from a predetermined location on said screen accurate distances of an amount desired and as indicated by said scale regardless of the power or prism effect of said lens blank.

References Cited in the file of this patent

UNITED STATES PATENTS

| | | |
|---|---|---|
| 790,059 | Howland | May 16, 1905 |
| 1,157,796 | Morehouse | Oct. 26, 1915 |
| 1,164,795 | Emerson | Dec. 21, 1915 |
| 1,424,941 | Pirwitz | Aug. 8, 1922 |
| 1,931,477 | Allen | Oct. 24, 1933 |
| 1,988,169 | Duckwall | Jan. 15, 1935 |
| 2,146,599 | Smith | Feb. 7, 1939 |
| 2,290,566 | Lockhart | July 21, 1942 |
| 2,348,858 | Sheehy | May 16, 1944 |
| 2,393,013 | Barnes et al. | Jan. 15, 1946 |
| 2,640,392 | Freeman | June 2, 1953 |
| 2,712,180 | Lueck | July 5, 1955 |
| 2,755,553 | Vaughan | July 24, 1956 |

OTHER REFERENCES

Manufacturing Optician, Bennett et al., article, vol. 7, No. 6, March 1954, pages 277–280.